A. A. VIK.
WAGON SEAT.
APPLICATION FILED MAR. 27, 1908.

922,546.

Patented May 25, 1909.
2 SHEETS—SHEET 1.

Witnesses
J. H. Crawford
F. B. MacNab

Inventor
Andrew A. Vik,

By Chandler & Chandler
Attorneys

A. A. VIK.
WAGON SEAT.
APPLICATION FILED MAR. 27, 1908.
922,546.
Patented May 25, 1909.
2 SHEETS—SHEET 2.
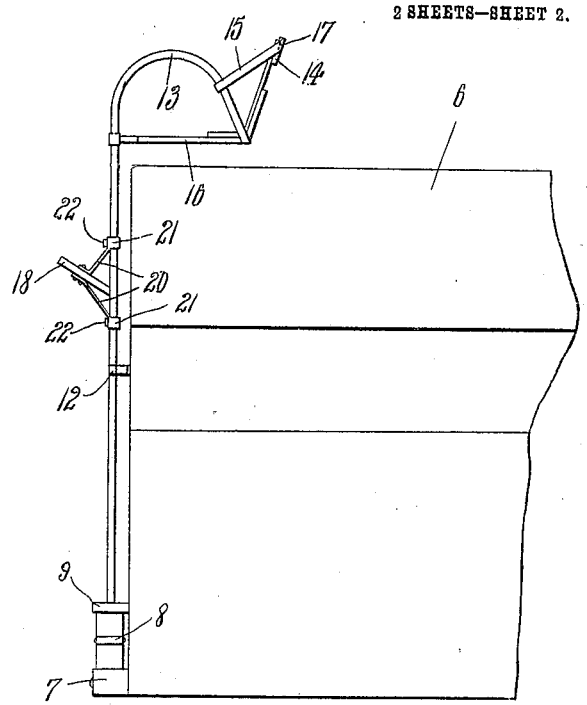
Fig. 2
Fig. 4.
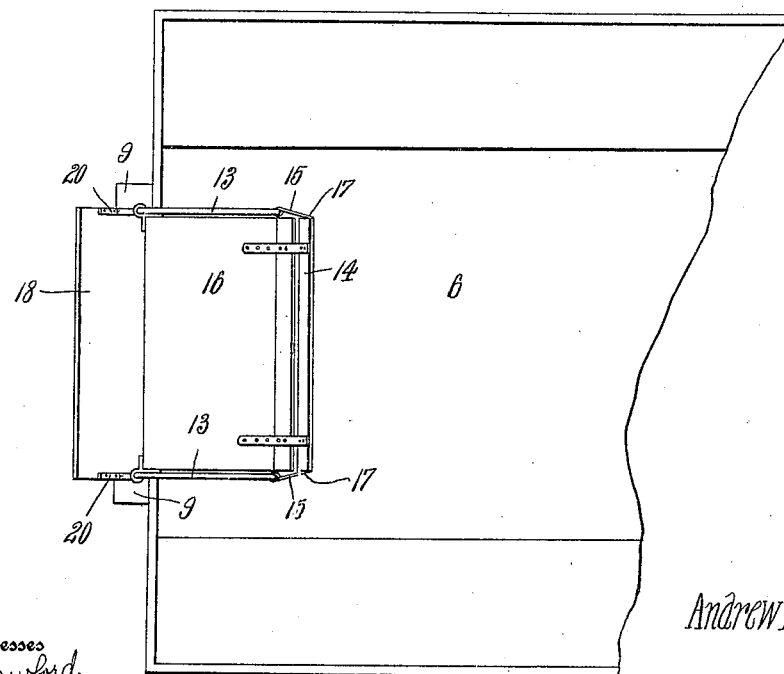
Witnesses
J. H. Crawford
F. B. MacNab
Inventor
Andrew A. Vik,
By
Attorneys

UNITED STATES PATENT OFFICE.

ANDREW A. VIK, OF NORTHWOOD, NORTH DAKOTA.

WAGON-SEAT.

No. 922,546.     Specification of Letters Patent.     Patented May 25, 1909.

Application filed March 27, 1908. Serial No. 423,669.

*To all whom it may concern:*

Be it known that I, ANDREW A. VIK, a citizen of the United States, residing at Northwood, in the county of Grand Forks, State of North Dakota, have invented certain new and useful Improvements in Wagon-Seats; and I do hereby declare the following to be a full, clear, and exact description of the invention, such as will enable others skilled in the art to which it appertains to make and use the same.

This invention relates to an improvement in wagon seats and foot-boards for vehicles and more especially for use on grain wagons, trucks, and drays and other heavy vehicles.

The objects of my invention are to make a wagon seat and foot-board which will be simple in construction, strong and serviceable in use, and cheap to manufacture. Also, to provide a wagon seat and foot-board which will be resiliently supported, thus insuring ease and comfort to the driver of the vehicles.

Another object of my invention is to provide a foot-board which may be raised or lowered and adjusted as desired, and which may be very readily attached to vehicles now in use without any substantial alteration of the said vehicle.

A further object is to provide a wagon seat and adjustable foot-board which may be supported by one and the same spring, so that the seat and foot-board having been adjusted, the desired distance apart, will move simultaneously without altering substantially their spaced relation.

I attain the above and other objects by means more fully described and claimed hereinafter, and also illustrated in the accompanying drawings which form a part of this specification.

Figure 1:
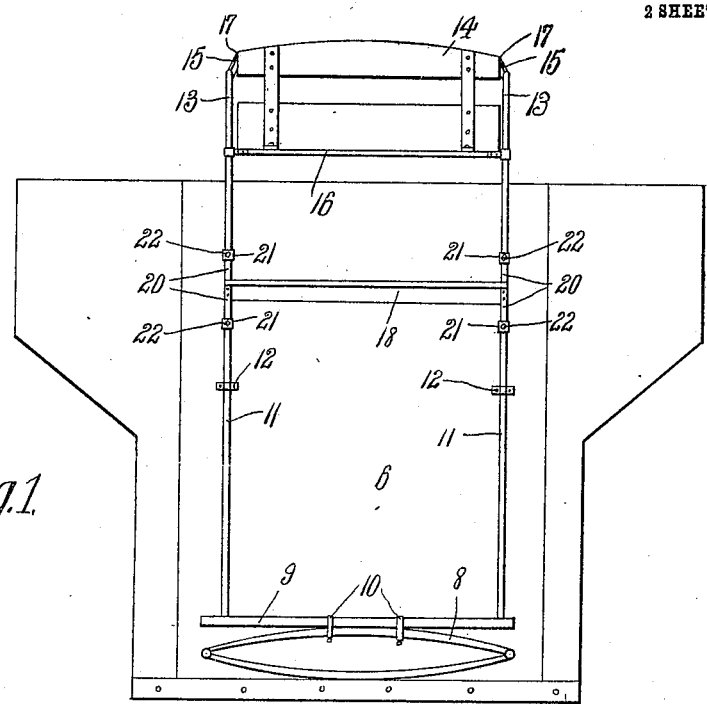
Figure 3:
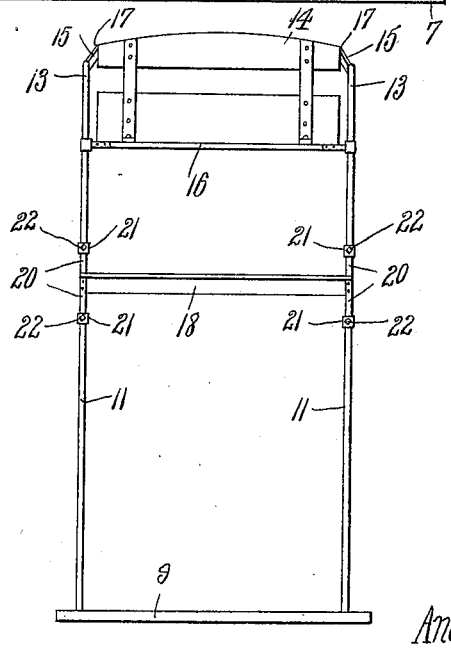

In the drawings, Figure 1 is a front elevation of my invention attached to a vehicle. Fig. 2 is a side elevation of the same. Fig. 3 is a front elevation of my invention detached from a vehicle. Fig. 4 is a top plan view of the invention attached to a vehicle.

In the drawings like numerals indicate like parts throughout.

The numeral 7 designates a supporting beam, which is secured adjacent to the bottom of the front of the wagon body 6. Supported upon and secured to the said beam 7, is the elliptic spring 8, running longitudinally thereto. A flat bar 9 is fastened to the top portion of the said elliptic spring 8 by securing bolts 10, and secured at each end of the bar 9, and extending upwardly are the seat standards 11. These standards pass through the guiding loops 12, which are secured to the front of the wagon body and which, while they allow free longitudinal movement of the standards 11, hold the same from lateral movement. Adjacent to their upper ends, the above mentioned standards are curved as at 13, so that the curved portion will overlie the inside of the wagon body. A seat board 16, having a back rest 14, is suitably fastened between said standards at the points 17, and by the braces 15. It will be seen that by fastening the front of the seat board to the upright portion of the above mentioned standards, and the rear of said board to the end of the curved portions of the same, the intermediate curved portion will serve as side rails or arm rests.

The numeral 18 indicates a foot-board, which is adjustably secured to the seat standards 11, by means of braces 20, said braces engaging the standards 11 by means of integrally secured rings 21, which in turn are adjustably held to said standards by means of bolts 22, or other suitable means, whereby the said board 18 may be raised or lowered as described.

From the above description it will be seen that I have provided a seat and foot-board, which when the said board has been adjusted as desired, will always be in the same adjusted spaced relation to each other, no matter what proportion of weight is on the seat or on the foot-board. It will be likewise seen that my invention may be easily attached to a wagon by simply bolting or otherwise securing the beam 7 to the front of the wagon body, and securing the guiding loops 12 with the standards passing through them, to the front of the wagon body.

What is claimed, is:—

In a device of the class described, a beam secured to the front of a wagon body, a spring supported upon said beam and secured thereto, a cross bar secured to the top of said spring, seat standards secured to each end of said cross bar and extending upwardly and curved adjacent their upper ends, and a seat secured between the curved portions of said standards whereby said curved portions will form side rails for said seat.

In testimony whereof, I affix my signature, in presence of two witnesses.

ANDREW A. VIK.

Witnesses:
CHAS. GUSTAFSON,
THOMAS OLSON.